US012448122B2

(12) United States Patent
Russell

(10) Patent No.: US 12,448,122 B2
(45) Date of Patent: Oct. 21, 2025

(54) SYSTEM AND METHOD FOR AUTONOMOUS LIGHT AIRCRAFT OPERATION

(71) Applicant: Birket IP Holdings, Inc., Seychelles (CN)

(72) Inventor: David Wayne Russell, Winter Garden, FL (US)

(73) Assignee: BIRKET IP HOLDINGS, INC., Hong Kong Sar (CN)

(*) Notice: Subject to any disclaimer, the term of this patent is extended or adjusted under 35 U.S.C. 154(b) by 184 days.

(21) Appl. No.: 18/222,754

(22) Filed: Jul. 17, 2023

(65) Prior Publication Data

US 2023/0356835 A1    Nov. 9, 2023

Related U.S. Application Data

(63) Continuation-in-part of application No. 17/686,864, filed on Mar. 4, 2022, now abandoned, which is a
(Continued)

(51) Int. Cl.
*B64C 39/02* (2023.01)
*B60F 5/02* (2006.01)
(Continued)

(52) U.S. Cl.
CPC ............ *B64C 29/0016* (2013.01); *B60F 5/02* (2013.01); *B64C 37/00* (2013.01); *B64C 39/02* (2013.01);
(Continued)

(58) Field of Classification Search
CPC ...... B64C 29/0016; B64C 39/02; B64C 37/00; B64C 39/024; B64C 2201/141; B64C 2201/108; B64C 2201/128; B64C 2201/146; B64C 2201/162; B64C 2201/187; B64C 2201/208; G05D 1/00;
(Continued)

(56) References Cited

U.S. PATENT DOCUMENTS 11,565,807 B1 * 1/2023 Zuckerman ............ G06Q 50/28
2003/0060962 A1   3/2003 Carroll
(Continued)

FOREIGN PATENT DOCUMENTS

CN           105551280 A      5/2016

*Primary Examiner* — Masud Ahmed
(74) *Attorney, Agent, or Firm* — ALLEN, DYER, DOPPELT + GILCHRIST, P.A.

(57) ABSTRACT

Unmanned Aerial Vehicles also known as UAVs or Drones, either autonomous or remotely piloted, are classified as drones by the US Federal Aviation Administration (FAA) as weighing under 212 pounds. The system described herein details Autonomous Flight Vehicles (AFV) which weigh over 212 pounds but less than 1,320 pounds which may require either a new classification or a classification such as Sport Light Aircraft, but without the requirement of a pilot due to the safe autonomous flight system such as the Safe Temporal Vector Integration Engine or STeVIE. Safe Autonomous Light Aircraft (SALA) are useful as drone carriers, large scale air package or cargo transport, and even human transport depending on the total lift capability of the platform.

8 Claims, 5 Drawing Sheets

Related U.S. Application Data continuation of application No. 16/089,357, filed as application No. PCT/US2017/025165 on Mar. 30, 2017, now abandoned.

(60) Provisional application No. 62/315,979, filed on Mar. 31, 2016.

(51) Int. Cl.

| | | |
|---|---|---|
| *B64C 29/00* | (2006.01) | |
| *B64C 37/00* | (2006.01) | |
| *G05D 1/00* | (2006.01) | |
| *G08G 5/26* | (2025.01) | |
| *G08G 5/52* | (2025.01) | |
| *G08G 5/54* | (2025.01) | |
| *G08G 5/55* | (2025.01) | |
| *G08G 5/57* | (2025.01) | |
| *B64U 30/20* | (2023.01) | |
| *B64U 50/14* | (2023.01) | |
| *B64U 70/60* | (2023.01) | |
| *B64U 80/86* | (2023.01) | |
| *B64U 101/60* | (2023.01) | |

(52) U.S. Cl.
CPC ............ *B64C 39/024* (2013.01); *G05D 1/00* (2013.01); *G05D 1/0022* (2013.01); *G05D 1/0061* (2013.01); *G05D 1/102* (2013.01); *G08G 5/26* (2025.01); *G08G 5/52* (2025.01); *G08G 5/54* (2025.01); *G08G 5/55* (2025.01); *G08G 5/57* (2025.01); *B64U 30/20* (2023.01); *B64U 50/14* (2023.01); *B64U 70/60* (2023.01); *B64U 80/86* (2023.01); *B64U 2101/60* (2023.01); *B64U 2201/10* (2023.01); *B64U 2201/20* (2023.01)

(58) Field of Classification Search
CPC .... G05D 1/102; G05D 1/0022; G05D 1/0061; B60F 5/02; G08G 5/0013; G08G 5/0065; G08G 5/0069; G08G 5/025; G08G 1/087; G08G 5/006

See application file for complete search history.

(56) References Cited

U.S. PATENT DOCUMENTS

| | | | |
|---|---|---|---|
| 2007/0086657 A1* | 4/2007 | Harder | G01S 17/933 382/199 |
| 2009/0021397 A1* | 1/2009 | Wipf | G08G 5/0013 340/945 |
| 2010/0123737 A1* | 5/2010 | Williamson | G06T 15/20 345/672 |
| 2012/0143482 A1 | 6/2012 | Goossen | |
| 2012/0191333 A1 | 7/2012 | Sawhill | |
| 2012/0245834 A1 | 9/2012 | Klooster | |
| 2013/0206915 A1 | 8/2013 | Desauliniers | |
| 2013/0214089 A1 | 8/2013 | Cox et al. | |
| 2014/0018979 A1 | 1/2014 | Goossen et al. | |
| 2014/0032034 A1 | 1/2014 | Raptopoulos | |
| 2016/0068264 A1* | 3/2016 | Ganesh | G05D 1/0676 701/2 |
| 2016/0359986 A1* | 12/2016 | Jones | H04L 67/2814 |
| 2016/0371984 A1 | 12/2016 | Macfarlane | |
| 2017/0253329 A1* | 9/2017 | Champagne, Jr. | B64C 39/024 |
| 2018/0203465 A1* | 7/2018 | Suzuki | B64F 1/00 |

* cited by examiner

SYSTEM AND METHOD FOR AUTONOMOUS LIGHT AIRCRAFT OPERATION

FIELD OF THE INVENTION

This invention relates generally to the field of automatic or autonomous vehicles and more specifically to a safe command and control methodology for autonomous light aircraft.

BACKGROUND OF THE INVENTION

UAVs or drones have proven to be useful tools in a number of industries but safety concerns and weight limitations limit their utility. Utilization of efficient motor-generator sets to create electricity from liquid fuel and higher efficiency motors lead to autonomous platforms with much higher lift capabilities, range, and safety, but above a given total weight such as but not limited to 212 pounds, the vehicle may no longer considered a "drone" or UAV and is instead classified as a Sport Light Aircraft, except that these craft do not require pilots. Other examples of light aircraft are over 125 models of fixed wing and glider aircraft. Aviation rules and regulations are changing at an increased rate, one practiced in the art would see that the actual weight limit and capacity might change without altering the intention of this invention.

While a number of companies now are attempting "flying cars", such as Terrafugia, Audi, Moller, Aeromobil, and Hoverbike, the problem that prevents almost all of these attempts from mainstream viability is the unfortunate fact that the driver must be a certified pilot to fly one.

Increased lift capability is particularly useful in drone carrier vehicles, cargo transfer vehicles, and even human transport vehicles, and made even more effective if the requirement for a human pilot can be removed. Fully autonomous vehicles for human transport are being investigated without liquid fuel engines, but these have very limited range and flight duration.

SUMMARY OF THE INVENTION

In an embodiment, a system for automated light aircraft operation utilizes autonomous and/or automated control to fly from source to destination point without the requirement of an onboard certified pilot, which communicates and/or cooperates with street traffic signals and/or regulations, as well as air traffic and airport instructions, procedures, and methodology. Autonomous control can be via a remote pilot. Autonomous control can be implemented on the craft. Autonomous control can be implemented with a temporal vector integration engine. Liftoff and/or landing sites can be coordinated with street light traffic control systems. The system can be utilized for package and/or cargo delivery. Some number of human occupants can be transported. A user interface, mobile communications device, computer or Internet connected device can be used to request the vehicle for transport. Dedicated safety launch/landing pads can be placed in specific locations for human transport and/or package and/or cargo pickup and/or delivery. Protective devices or configurations can be actuated when grounded to protect humans, pets, or animals from the propulsion system. The platform can coordinate with Air Traffic Control (ATC) or a third party dispatch system to define the navigation points, trajectory, and timing for the vehicle. The navigation points can be designed by a human user interface system and loaded into the craft but, if necessary, the ATC or third party dispatch system still validates the navigation plan. Weight limits can be modified based on local laws and jurisdictions. The platform can be configured as a drone carrier with hard automated docking of the secondary platforms including additional drone carriers. Additional drive wheels or surface drive wheels can be implemented in combination with other aircraft components (e.g., engine covers and/or landing gear) and driven to provide motive power and/or steering to the platform on surface roads. Alternatively, motive power is provided by other means than driving the wheels. All movement in air, on land, or on sea can be controlled by the automation and/or autonomy systems. Land movement can be allowed as a manual override via the occupant or a remote driver, but all air movement can be controlled by the automation systems. An assigned trajectory can be loaded into the platform before takeoff or while in a holding location and altitude pending the flight trajectory plan. A multidimensional (for example without limitation 3 or 4) inverse-geofence or Free Flight Corridor structure can be loaded into the platform before takeoff or while in a holding location and altitude pending the flight trajectory plan.

An autonomous light aircraft used in the system may be distinguished in part by a total vehicle weight of more than 212 pounds and less than 1,320 pounds, but without the requirement of a human pilot on board. In one embodiment this could be achieved by a remote pilot, but in order to design the system for maximum safety to the general public and the occupants, the system most advantageously includes a fully autonomous and/or automated flight system such as but not limited to the temporal vector integration engine. The temporal vector integration engine utilizes a splinebased 4D mathematical trajectory model of the navigation path hereinafter referred to as a trackpath which may be computed by a 4D autorouter for increased accuracy and safety.

An important benefit of such a system is that once a source and destination point is input to the Air Traffic Control (ATC) system that handles Unmanned Aerial Vehicles (UAV) and Autonomous Aerial Vehicles (AAV), the same system can plot in 4 dimensions the optimum path for the system vehicle(s) as well as taking all other known traffic into account. Once the flight path and timing for this vehicle is established, it's simply an AAV with larger payload. The temporal vector integration engine is designed to follow its trackpath with high accuracy, it has built-in avoidance of the inverse-geofence or Free Flight Corridor (FFC) restriction of its flight path, obstacle avoidance within the FFC, and terminal guidance to land the vehicle safely even in the case of emergency.

While certification of these vehicles for human occupancy may take some time, they can be utilized more quickly as autonomous cargo carriers and drone carrier vehicles.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

The novel features believed characteristic of the illustrative embodiments are set forth in the appended claims. The illustrative embodiments, however, as well as a preferred mode of use, further objectives, and features thereof will best be understood by reference to the following detailed description of illustrative embodiments of the present disclosure when read in conjunction with the accompanying drawings, wherein:

DETAILED DESCRIPTION OF THE INVENTION

The following detailed description illustrates embodiments of the invention by way of example and not by way of limitation. The description clearly enables one skilled in the art to make and use the disclosure, describes several embodiments, adaptations, variations, alternatives, and use of the disclosure, including what is currently believed to be the best mode of carrying out the disclosure. The disclosure is described as applied to an exemplary embodiment namely, systems and methods for the creation of an autonomous light aircraft operation system. However, it is contemplated that this disclosure has general application to vehicle management systems in industrial, commercial, military, and residential applications.

As used herein, an element or step recited in the singular and preceded with the word "a" or "an" should be understood as not excluding plural elements or steps, unless such exclusion is explicitly recited. Furthermore, references to "one embodiment" of the present invention are not intended to be interpreted as excluding the existence of additional embodiments that also incorporate the recited features.

The different illustrative embodiments recognize and take into account a number of different considerations. "A number", as used herein with reference to items, means one or more items. For example, "a number of different considerations" means one or more different considerations. "Some number", as used herein with reference to items, may mean zero or more items.

Figure 1:
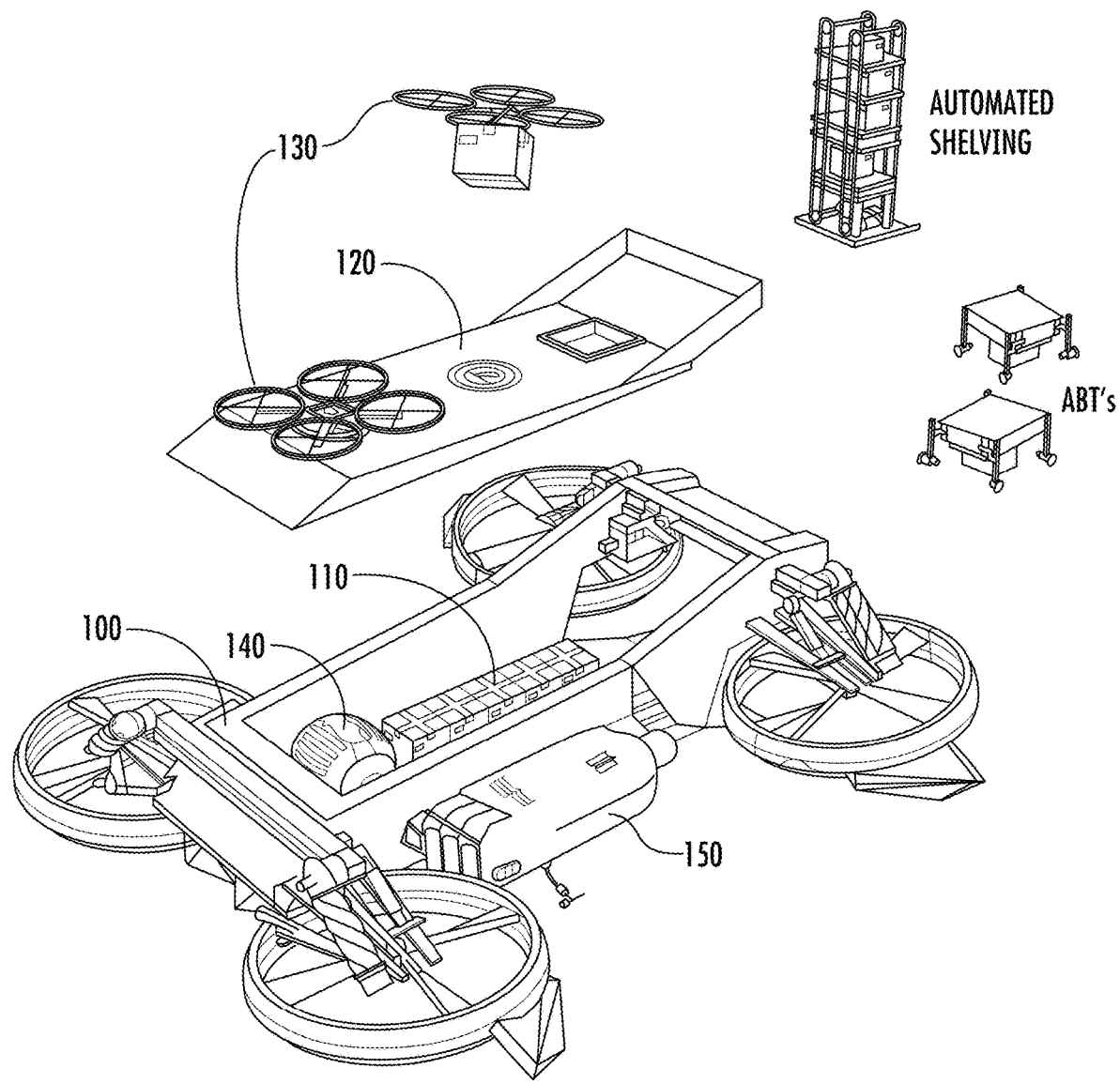
FIG. 1 depicts an overall schematic diagram of the components of a system for automated light aircraft operation.

FIG. 1 depicts the overall components of a system for autonomous light aircraft operation. In one embodiment this aircraft may be implemented as an air cargo carrier. In other embodiments it could be utilized as a drone carrier providing automated docking and undocking facilities for other AAVs which perform the function of last mile delivery from the aircraft of the system.

The system includes a autonomous aircraft 100 with a cargo area 110. In one embodiment the cargo area is configured to allow for automated loading and unloading by Automated Box Transfer Vehicles (ABT) and automated shelving. In another embodiment it could simply be a cargo carrier with random boxes or other containers. In a drone carrier configuration, a docking platform 120 is provided for one or more AAVs 130 which can receive the packages from the loading platform. Once the AAV has grasped and tested the package for flight, the system automatically requests a flight path from the ATC from its current location to the package destination.

If no ATC is available, a base plus offset trackpath can be automatically designed by a processing system within the system, or requested from another third party distribution control center. The AAV may then deliver the package, possibly return with another package, and at the end of the sequence hard dock with the docking platform 120 or other for return to the distribution center.

The aircraft 100 may contain an autonomous control system 140 such as but not limited to a temporal vector integration engine for flight control and one or more high efficiency motor-generator sets 150 to generate propulsive power. In other embodiments actual motorized propeller and/or ducted fan propulsion could be implemented. The aircraft 100, to facilitate the temporal vector integration engine implementation, would also implement a suite of 3D imaging systems and other instruments to provide for collision avoidance and flight controls.

Figure 2:
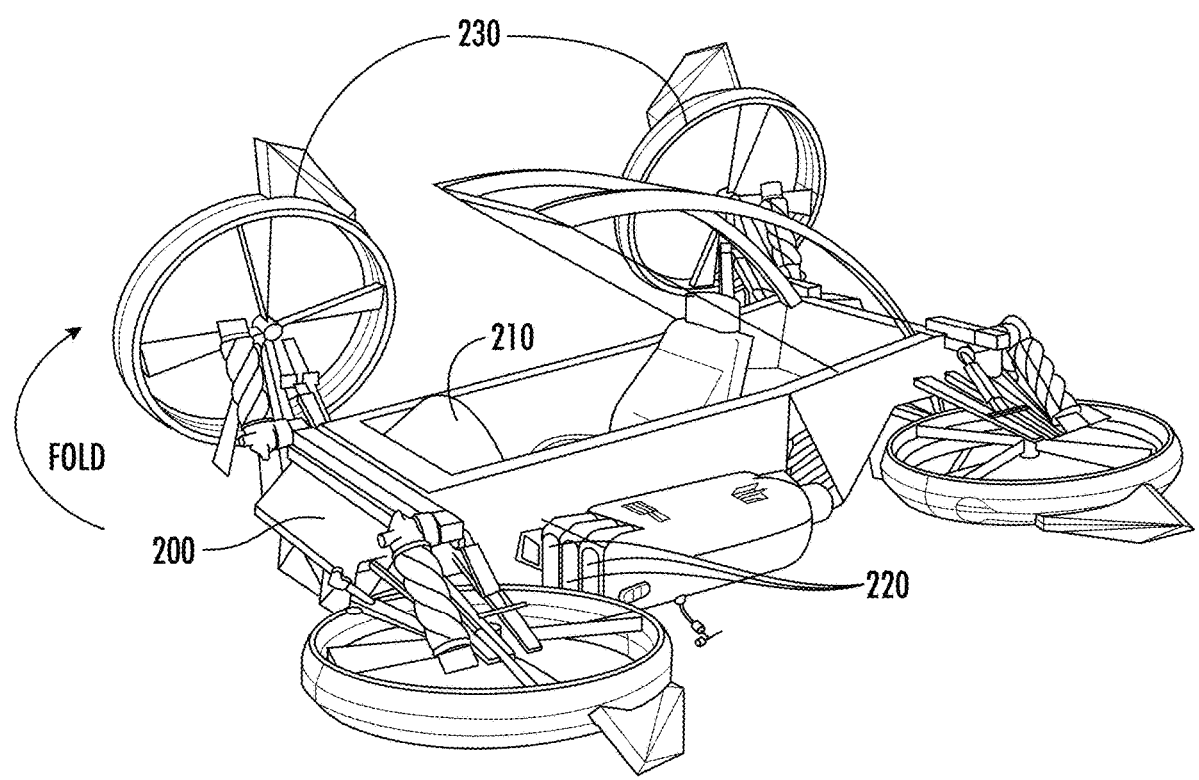
FIG. 2 depicts a light aircraft configured for human transportation and usable in connection with a system for automated light aircraft operation.

In FIG. 2, a system is depicted with an aircraft configured for human transport. In most safe autonomous craft, the primary consideration is keeping people away from the vehicle. In this case it is a necessity at loading and unloading. The vehicle itself 200 has all of the components of the aircraft 100 described in FIG. 1, but also includes a user interface 210 and also means for protecting the occupants or nearby humans from the propulsion system.

In one embodiment covers 220 slide into place once landing is achieved covering the ducted fan inputs. In another embodiment, in order to facilitate loading and unloading and present a smaller footprint, one or both of the vehicle sides 230 is folded vertically or raised above the entrance to the passenger compartment. For more complete protection, both systems or other protection could be utilized.

Additionally in one embodiment the source and landing points may not be secured. In another embodiment, due to the danger to humans, specific boarding and/or landing points could be defined, or a combination such as but not limited to a specific boarding area, but the ability to land at the passenger's residence where they can guarantee the security required for landing.

In another embodiment automated takeoff and landing platforms can be set up at building rooftops and certain street level locations. These could be implemented for example, without limitation, as trailers, driveable vehicles, automated vehicles, and/or deployable barriers. These can be deployed quickly, implemented as street vehicles or placed in rooftop or other locations and can be redeployed to other locations as required. For example, during business hours they could be removed from the streets if demand in the area is low and/or traffic is high, and brought out during evening hours. In another embodiment they may be moved from one area to another depending on demand.

In another embodiment a sensing and control system could be implemented which allows an autonomous light aircraft to land at any intersection with one or more stoplights in control of each street branch. The landing can be coordinated with the traffic light control system and when the craft is ready to land all four lights turn red, stopping traffic for the length of time the light aircraft disembarks its passengers and takes off again. This timing may be automated or determined by the number of vehicles landing and taking off and their status. In another embodiment, the propulsion system covers 230 may also serve as surface wheels such that in one of their folded positions they may drive the vehicle on the surface road to clear the intersection.

Once the passengers are seated and secured, the user interface allows the user to enter the destination coordinates. In another embodiment this could have already been scheduled by any communications and/or Internet capable device such as, but not limited to, a smart phone, tablet, or personal computer. If this is a pay-for-use transport service, payment could be taken at time of boarding or prepaid. In another embodiment identification of one or more of the occupants could be required before the system commits to liftoff.

Once the flight path is computed either by the Air Traffic Control or another third party service the launch time is set and the light aircraft launches to complete the flight. This type of transport is differentiated from the concept of a "driverless car" by the fact that this airspace is primarily controlled for every air vehicle by the ATC, where roads are primarily occupied by human piloted vehicles with minimal traffic control. In another embodiment the light aircraft may be allowed to liftoff to a designated staging altitude to clear the street while air traffic control approval is pending.

Figure 3:
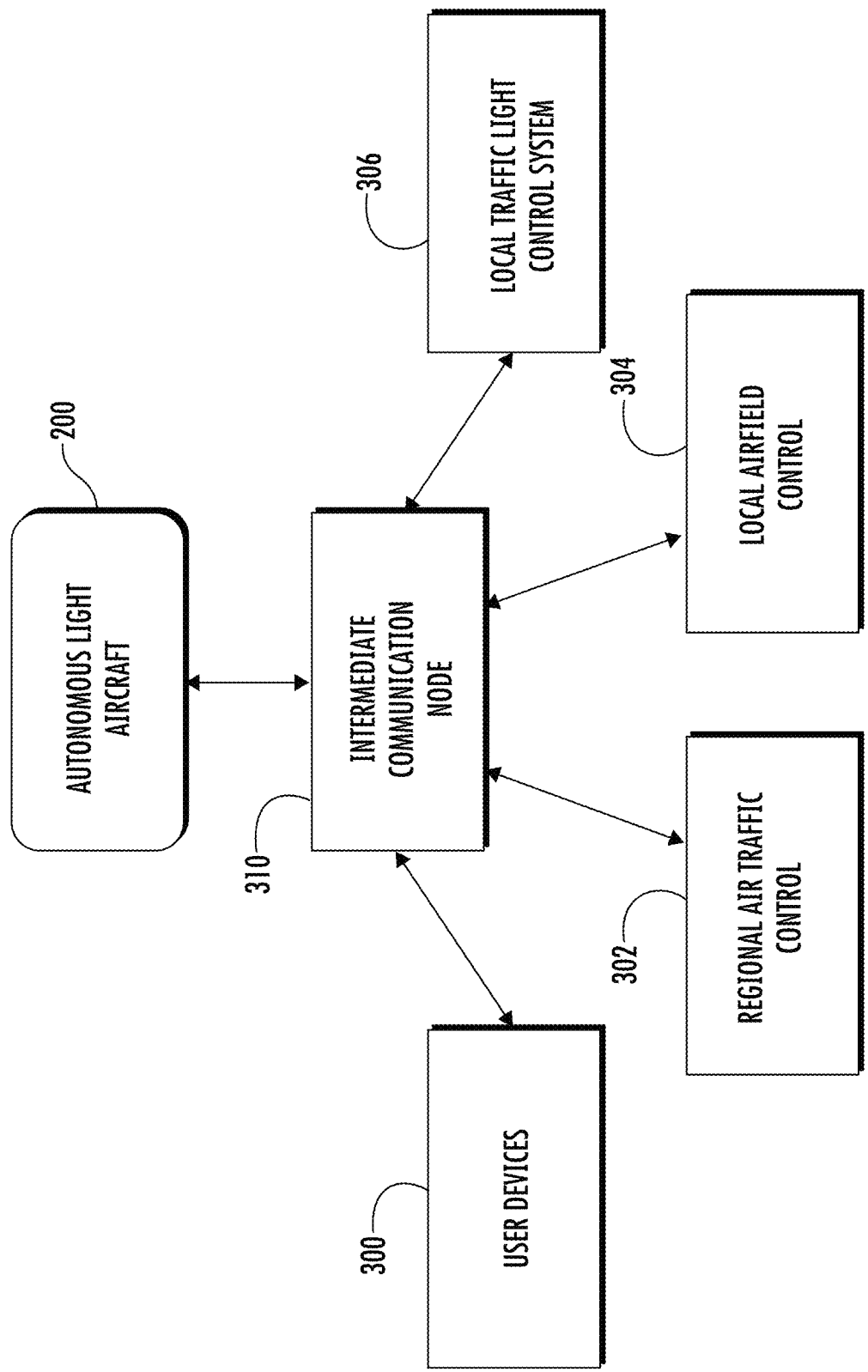
FIG. 3 is a schematic overview of a light aircraft and interrelated system components.

Referring to FIG. 3, an autonomous light aircraft 200 communicates with one or more user devices 300, regional air traffic control 302, local airfield control 304 and a local traffic light control system 306, either directly or via one or more intermediate communication nodes 310. For instance, the intermediate communication node 310 can receive and transmit radiofrequency (RF) line-of-sight communications or indirect communications (such as via satellite, cellular data network or other wide or local area network) from and to the autonomous aircraft 200 and relay them as necessary to the other system components.

In some implementations, the autonomous light aircraft 200 communicates directly with certain components and directly with other components. For example, the aircraft could communicate directly with local airfield control 304 and indirectly with regional air traffic control. In some implementations, the mode of communication may depend on the relative position of the aircraft to the other components. For example, the light aircraft 200 might communicate indirectly through one or more nodes 310 until in range for direct radio communication with the component(s).

The user devices 300 include, for example, smart phones, tablet computers, and other personal computers. A user device 300 might also include a user interface installed within the light aircraft. Users are able to request service from the autonomous light aircraft system, identify pick up and drop off locations, make payment and the like.

Regional air traffic control 302 could be any authority regulating airspace in the operational area of the autonomous light aircraft 200. For some routes, it is contemplates that the route of the aircraft 200 might pass through different regions such that communications with more than one regional air traffic control 302 would be utilized. In a typical implementation, the autonomous light aircraft 200 submits routes for approval to the regional air traffic control 302 and receives route clearances in reply. In other implementations, the aircraft may simply submit its current location, or entry location into a controlled area, along with a destination, and receive clearance in the form of an approved route. In some implementations, a route may not pass through any controlled airspace.

Local airfield control 304 could include controlled airfields, with landing and/or ground control. However, as used herein in connection with implementations of the invention, it will be appreciated that local airfield control 304 does not necessarily refer to a traditional "airport" with one or more runways.

As discussed above, the present invention can implemented with the autonomous vehicle 200 making road landings, and advantageously in road intersections controlled by traffic lights. In such implementations, the vehicle communicates with one or more traffic light control system 306. Clearance to land can be requested in the form of a requested time period in which the traffic light control system 306 will shut down an intersection by turning all approaching lights red. Alternatively, the traffic light control system could give clearance to land by providing one or more pre-scheduled intersection shut down times, in which case the autonomous aircraft 200 would route plan with an arrival time based on the accepted pre-scheduled time.

Figure 4A:
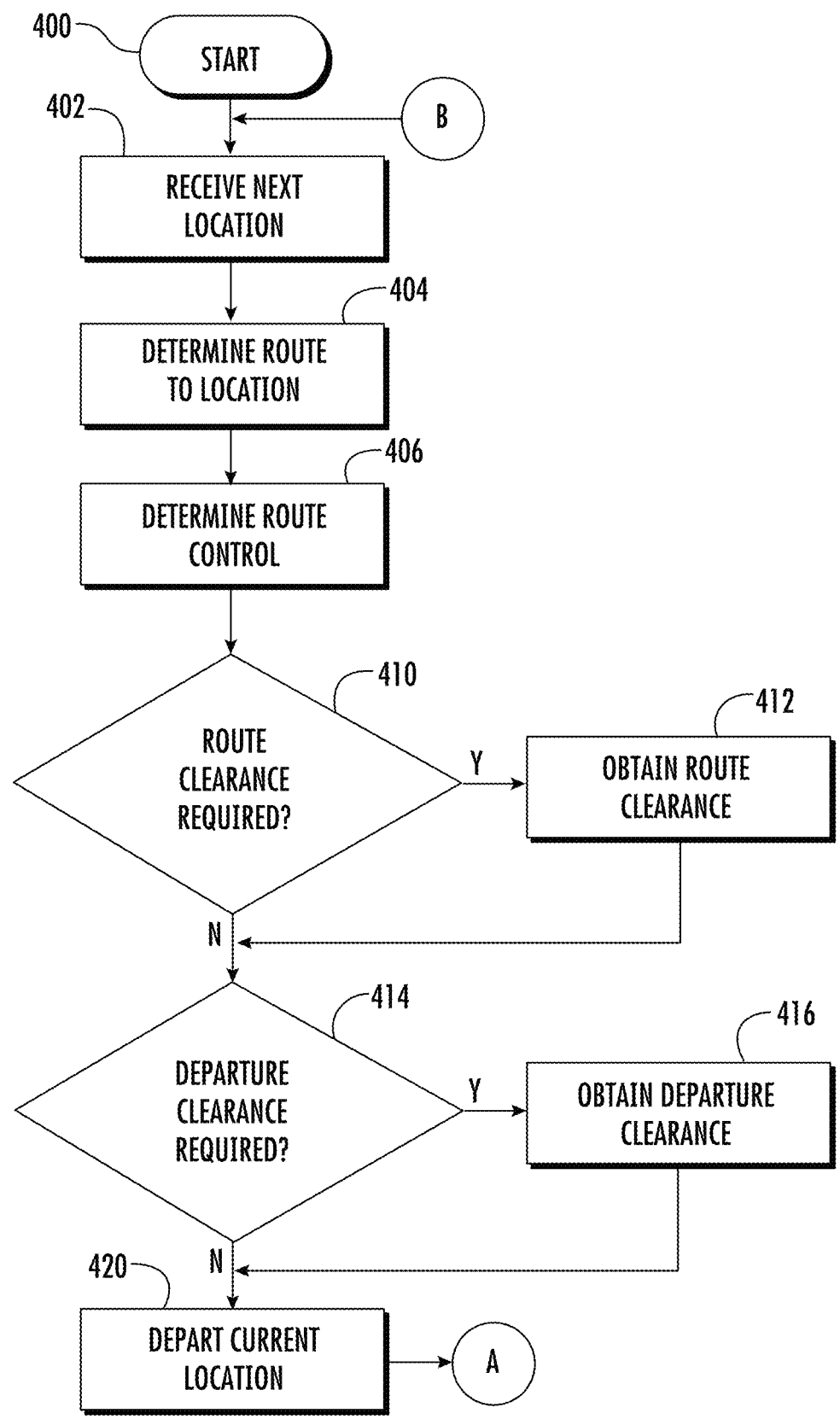
FIGS. 4A and 4B are a flow diagram of operations of the light aircraft in connection with the system components of FIG. 3.
Figure 4B:
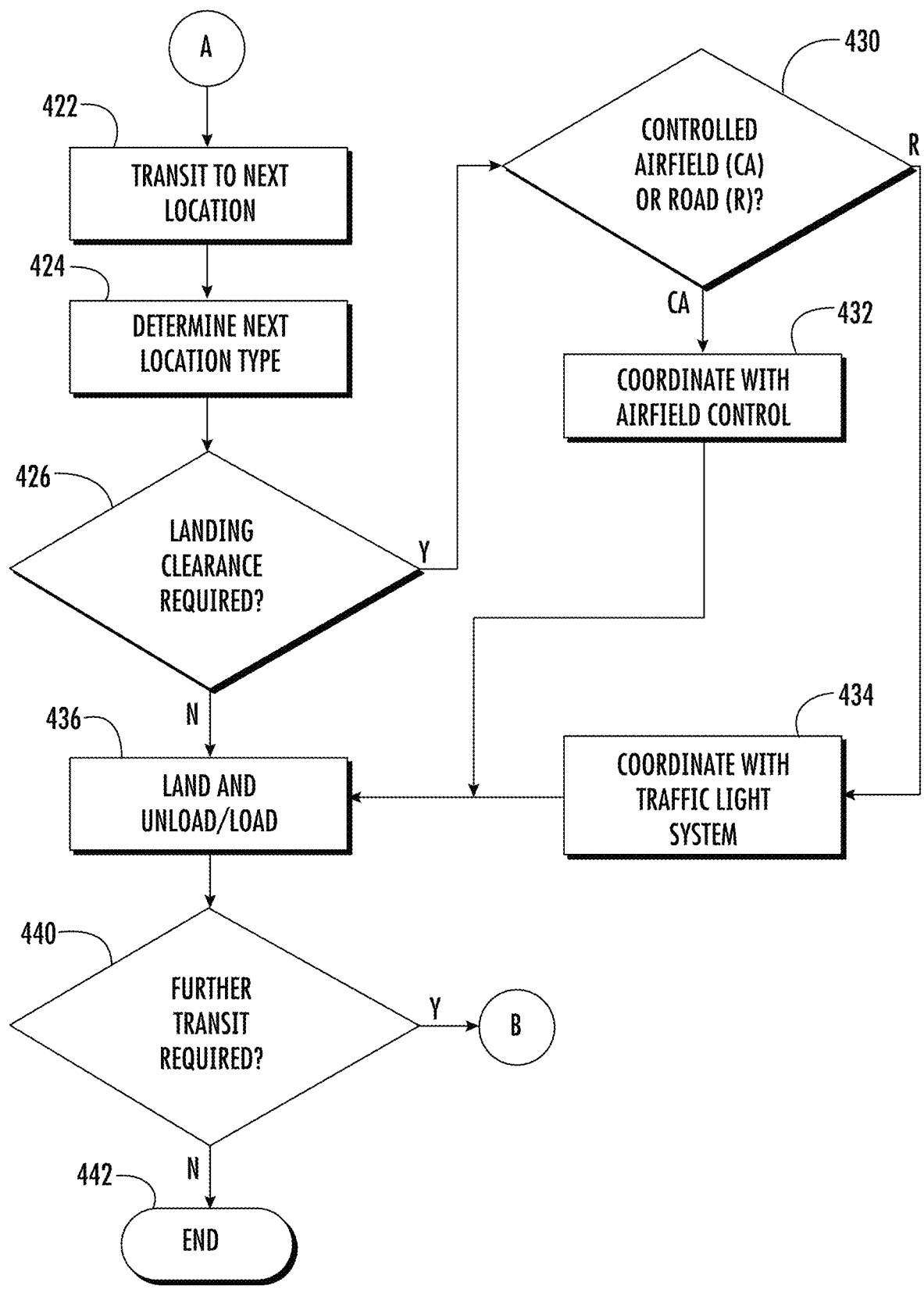

Referring to FIGS. 4A and 4B, a method implementations begins at block 400. At block 402, an autonomous aircraft receives it next location. As discussed above, this could occur in advance via reservations or other advance orderings, or be input directly into a user interface of the vehicle by one or more passengers. At block 404, the aircraft determines the route to its next location. The route can be calculated onboard the aircraft, requested from an outside source, or some combination of these. As also discussed, the aircraft can advantageously be equipped with the capability to avoid unforeseen obstacles detected along its route and otherwise modify the route as necessary to address circumstances, as well as communicate any such deviations or modifications to relevant authority(ies).

Where a route will pass through controlled airspace, the aircraft determines route control at block 406. As discussed previously, this and other processing can be performed completely by onboard computer, or some processing can be performed at a remote location and results transmitted to the aircraft. If, based on the determination of route control, it is determined that route clearance is required at block 410, then the aircraft obtains route clearance at block 412. This can involve obtaining multiple clearances, where a route passes through airspace subject to different authorities.

At block 414, it is determined whether departure clearance is required 414. For example, if the aircraft is departing from a private residence, departure clearance may not be required. On the other hand, departure clearance would be required if departing from a controlled airfield. In the case of departure from a roadway intersection, clearance may or may not required. In some cases, a departure confirmation may be required so the traffic light control system can verify it is safe to resume normal operation of traffic lights controlling the intersection. If departure clearance is required, then it is obtained at block 416 and the aircraft departs its current location at block 420.

It will be appreciated that these other method steps can be performed in any logical order. For instance, it may not be necessary for a vehicle route to be fully determined and/or cleared before departing its current location. In some instances, such as when required by time constraints, a vehicle may depart to a holding location to free up the departure location and then obtain additional route guidance/clearances while in the holding location.

At block 422, the aircraft transits to its next location and, at block 424, determines the next location type (e.g., private location, controlled airfield, road location). The determination of the next location step is indicated here for convenience; it will be appreciated that the determination could be made at any point after the next location was identified at step 402.

If, at block 426, it is determined that landing clearance is required, then the particular type of clearance is determined at block 430. If the landing location is a controlled airfield, then coordination of airfield control occurs at block 432. If the landing location is a roadway, then coordination with the traffic light control system occurs at block 434. It will be appreciated that the controlled airfield and road landing location types are non-limiting examples and the aircraft could be configured to determine and obtain necessary landing clearances at other suitable locations.

After the necessary clearance is obtained, or if no clearance was required, the autonomous light aircraft lands and unloads (and/or loads) at block 436. If further transit is required at block 440 (e.g., if a new passenger embarks or if the aircraft is requested to serve another passenger at another location), then the method returns to step 402. If not further transit is required, then the method ends at block 442.

While the foregoing written description of the invention enables one of ordinary skill to make and use what is considered presently to be the best mode thereof, those of ordinary skill will understand and appreciate the existence of variations, combinations, and equivalents of the specific embodiment, method, and examples herein. The invention should therefore not be limited by the above described embodiment, method, and examples, but by all embodiments and methods within the scope and spirit of the invention. Further, different illustrative embodiments may provide different benefits as compared to other illustrative embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A method of operating an autonomous aircraft system, the autonomous aircraft system comprising an air traffic controller (ATC) that generates a flight plan for an autonomous aerial vehicle (AAV) having an autonomous control system that controls autonomous flight of the AAV, the autonomous aircraft system further comprising a traffic light control system operable to control at least one traffic signal installed at a traffic intersection at which the AAV may land and transmit to the ATC scheduled time windows when the traffic light control system operates the at least one traffic signal to halt the surface vehicle traffic at the traffic intersection, the method comprising:

receiving within the autonomous control system of the AAV a flight plan generated from the ATC that includes a flight path having a scheduled landing at the traffic intersection during a scheduled time window when the traffic light control system controls the at least one traffic signal and halts the surface vehicle traffic at the traffic intersection;

flying the AAV to the street intersection having the at least one traffic signal installed thereat during a scheduled time window when the traffic light control system operates the at least one traffic signal to halt the surface vehicle traffic at the traffic intersection, the traffic light control system controlling the traffic signal to halt surface vehicle traffic at the traffic intersection; and landing the AAV at the intersection when the surface vehicle traffic is halted at the traffic intersection;

inputting into a user device at the AAV a confirmation that the AAV has departed the traffic intersection;

based upon the input at the user device that the AAV has departed the traffic intersection, generating a confirmation from the autonomous control system to the ATC that the AAV has departed the traffic intersection; and transmitting from the ATC to the traffic light control system the confirmation that the AAV has departed the traffic intersection, wherein the traffic light control system operates to resume normal control over the at least one traffic light at the traffic intersection.

2. The method of claim 1 wherein the AAV includes a temporal vector integration engine.

3. The method of claim 1 wherein the user device within the AAV includes a user interface configured to receive user input.

4. The method of claim 1 wherein the AAV includes ducted fan inputs and covers that slide into place over the ducted fan inputs when the AAV is landed.

5. An autonomous aircraft system, comprising:

an autonomous aerial vehicle (AAV) having an autonomous control system that controls autonomous flight of the AAV, said AAV including a user device coupled to the autonomous control system into which a confirmation is entered indicative that the AAV has departed from a landing site, said autonomous control system configured to transmit the confirmation;

an air traffic controller (ATC) that communicates with the AAV and generates a flight plan for AAV;

a traffic light control system that communicates with the AAV, said traffic light control system operable to control at least one traffic signal installed at a traffic intersection at which the AAV may land and transmit to the ATC scheduled time windows when the traffic light control system operates the at least one traffic signal to halt the surface vehicle traffic at the traffic intersection;

wherein the ATC is configured to transmit to the autonomous control system of the AAV the flight plan that includes a flight path having a scheduled landing at the traffic intersection during the time window when the traffic light control system controls the traffic signals and halts the surface vehicle traffic at the traffic intersection;

the traffic light control system controlling the traffic signal to halt surface vehicle traffic at the traffic intersection during the scheduled time window at which time the AAV lands at the traffic intersection;

based upon the input at the user device that the AAV has departed, the autonomous control system is configured to transmit to the ATC a confirmation that the AAV has departed the traffic intersection; and the ATC configured to generate to the traffic light control system the confirmation that the AAV has departed the traffic intersection, wherein the traffic light control system is configured to resume normal control over the at least one traffic light at the traffic intersection.

6. The autonomous aircraft system of claim 5 wherein the AAV includes a temporal vector integration engine.

7. The autonomous aircraft system of claim 5 wherein the user device within the AAV includes a user interface configured to receive user input.

8. The autonomous aircraft system of claim 5 wherein the AAV includes ducted fan inputs and covers that slide into place over the ducted fan inputs when the AAV is landed.

* * * * *